J. DUCREST.
STUMP PULLING MACHINE.
APPLICATION FILED DEC. 30, 1908.
929,661.
Patented Aug. 3, 1909.
2 SHEETS—SHEET 1.
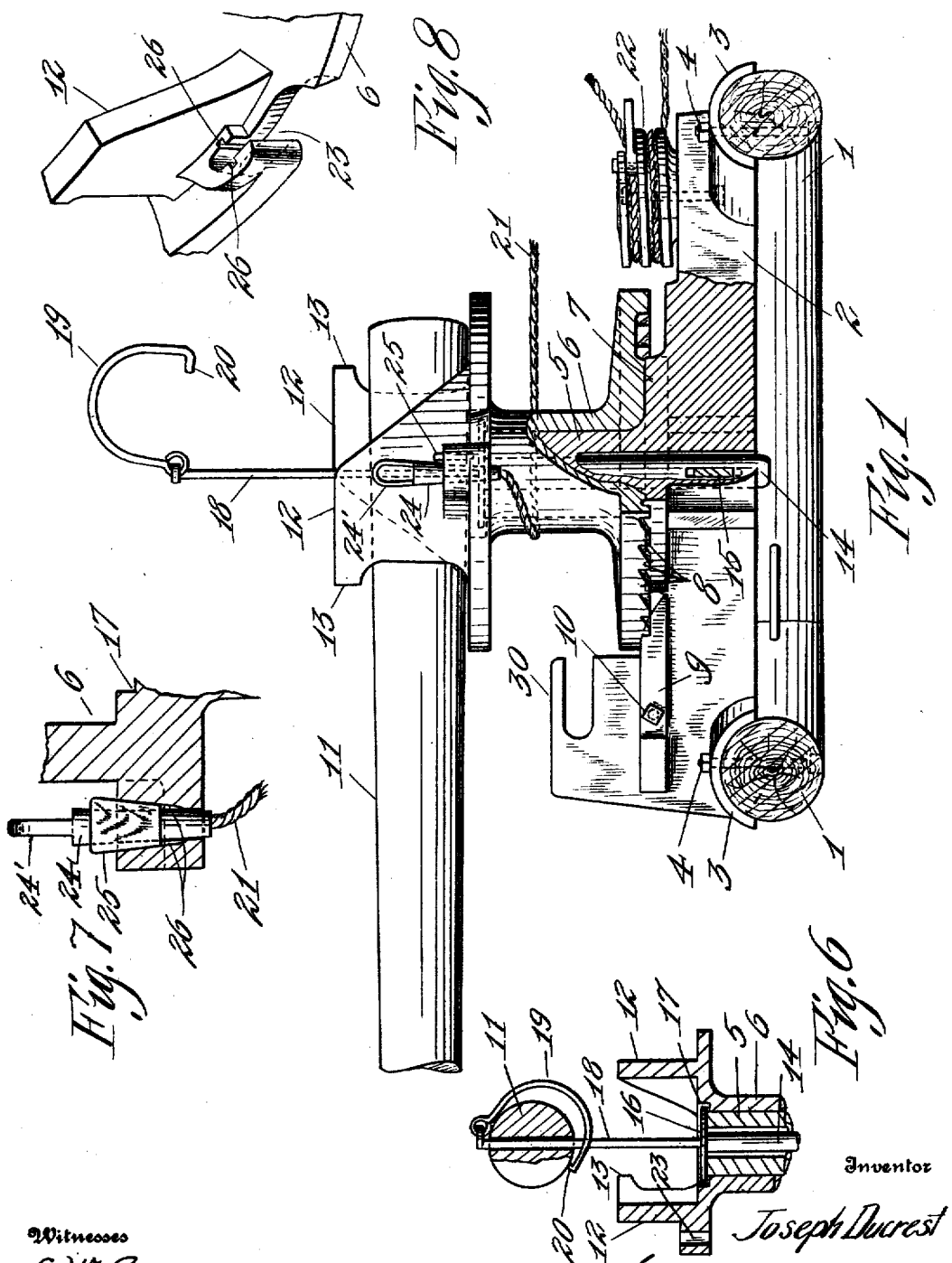
Witnesses
E. W. Cressman
Arlita Adams
Inventor
Joseph Ducrest
By Adams & Brooks
Attorneys

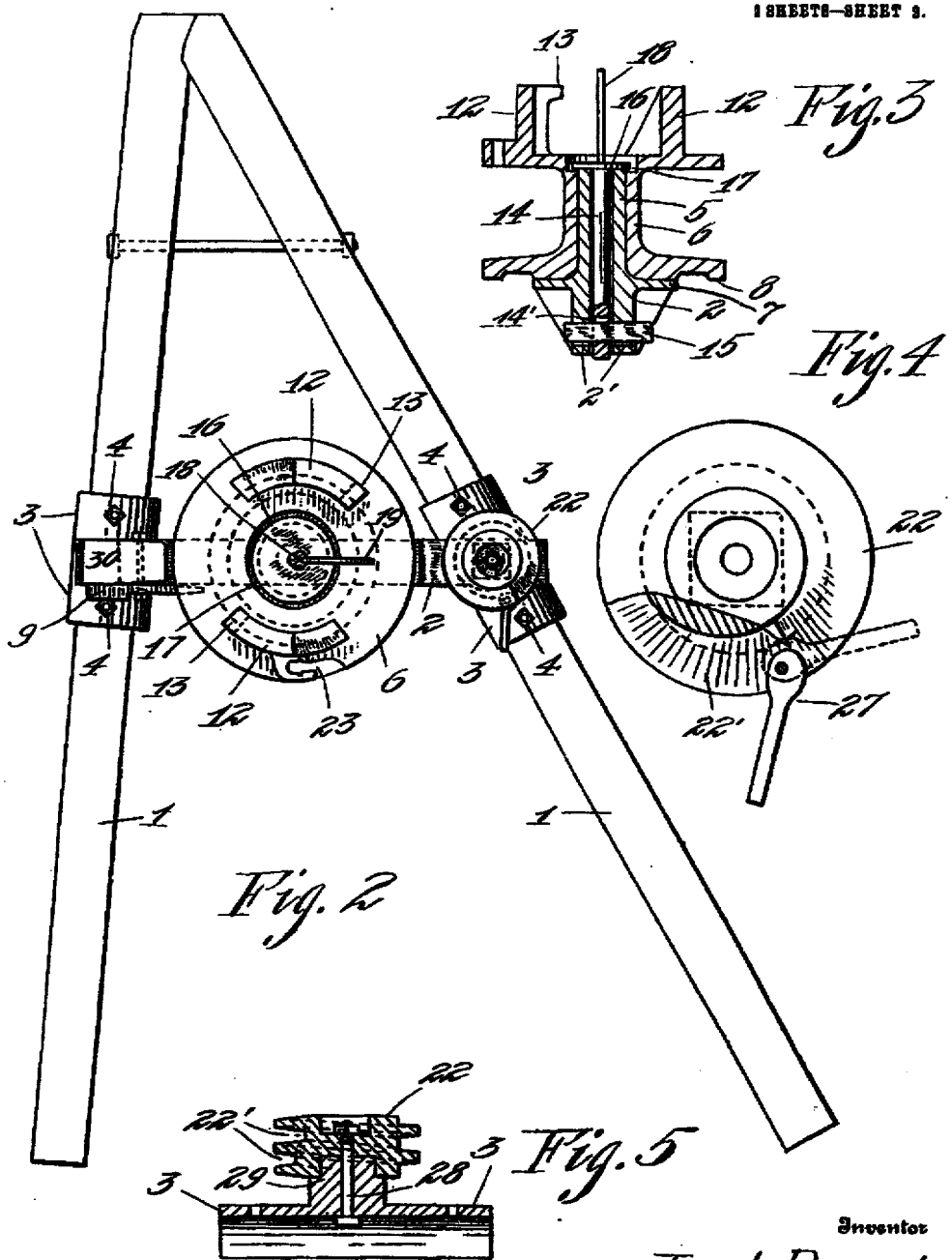

UNITED STATES PATENT OFFICE.

JOSEPH DUCREST, OF VICTORIA, BRITISH COLUMBIA, CANADA.

STUMP-PULLING MACHINE.

No. 929,661.     Specification of Letters Patent.     Patented Aug. 3, 1909.

Application filed December 30, 1908. Serial No. 470,102.

*To all whom it may concern:*

Be it known that I, JOSEPH DUCREST, a subject of the King of Great Britain, and a resident of the city of Victoria, in the Province of British Columbia, Canada, have invented certain new and useful Improvements in Stump-Pulling Machines, of which the following is a specification.

My invention relates to machines of the above type and has for its primary object the provision of a simplified and improved construction which will operate in an efficient manner.

With the above and other objects in view, to be referred to as my description progresses, my invention resides in the structural features, arrangements and combinations of parts, hereinafter described and succinctly defined in my annexed claims.

Referring to the accompanying drawings, wherein like numerals of reference indicate like parts throughout the several views: Figure 1 is a rear view with parts broken away, of a stump puller constructed in accordance with my invention. Fig. 2 is a top plan view thereof. Fig. 3 is a vertical sectional view, on reduced scale, of the winding drum and the supporting means therefor. Fig. 4 is a plan view of my improved means for holding the free end of the cable. Fig. 5 is a vertical sectional view thereof. Fig. 6 is a fragmentary sectional view, illustrating more particularly the sweep held in elevated position, and Figs. 7 and 8 are detail fragmentary views illustrating more particularly the means provided for making the cable fast on the winding drum.

In carrying out my invention, I provide a base of suitable construction, which while providing a firm support for the mechanism arranged thereon, also permits of the apparatus being readily hauled to the various fields of operation. As now constructed, this base comprises converging members 1, one of which is preferably arranged at a greater inclination than the other, as shown, and a cross connecting member 2, the latter of which is connected to the former at points substantially central of the lengths thereof.

To insure of a rigid connection between members 1 and 2, I provide the latter on each end portion with oppositely projecting concaved integral extensions 3 which extend over the upper faces of members 1 and well down over the sides thereof, as shown in Fig. 1, with which extensions bolts 4 are engaged. Connecting member 2 is provided with a vertically disposed stub shaft 5 on which a drum 6 is journaled. Drum 6 is seated on a boss 7, encircling said shaft, by which construction clearance between it and the upper face of member 2 is provided. On the underface of drum 6, at the outer edge portion thereof, I provide ratchet teeth 8, with which a gravity pawl 9, pivoted at 10 on member 2 engages.

Reference numeral 11 indicates the sweep to which a horse is hitched and driven in a circular path, in the usual manner, to impart rotary movement to drum 6. Sweep 11, normally rests on the top of drum 6 between upwardly projecting lugs 12, which lugs are provided, each at one end portion with angularly projecting lips 13. These lips 13, when the sweep is set at a slight angle between lugs 12, as when power is applied thereto, overlie the sweep and prevent upward movement thereof.

Reference numeral 14 indicates a rod, which it fitted in a vertical bore or channel of shaft 5, as shown, and secured to member 2 by a wedge shaped key 15, which when driven through the registering openings 14' and 2' (see Fig. 3) serves to draw rod 14 downwardly until the shoulder 16 thereof bears on the upper face of shaft 5. Shoulder 16 is of disk form and projects beyond the shaft into a seat 17, provided in the upper face of drum 6, thereby preventing upward movement of said drum and also providing a broad bearing to brace an upwardly projecting stem 18 on which sweep 11 is slidably engaged for upward movement to a position wherein it will lie clear of lugs 12, as clearly shown in Fig. 6. When in this position, said sweep is engaged by a catch 19, which holds the same elevated. Catch 19 is pivoted on the upper end portion of stem 18 and preferably comprises a curved body, whose free end portion is provided with a barb 20, which is adapted to be swung beneath the sweep and embedded in the underface thereof, as shown.

Reference numeral 21, indicates the cable which is passed from drum 6 to a pulley (not shown) fastened to the stump to be extracted, then back to the apparatus where it is secured to a block 22. The means for securing cable 21 to drum 6 is novel, the same including a socket 23, and engaging member 24 and a keeper 25. Socket 23, in the present embodiment of my invention consists of a slot extending inwardly from the edge of the upper flange of drum 6 and having its side walls converging in a downward direction, see Fig. 7. Engaging member 24 is fastened on one end of cable 21, then inserted into socket 23 through the open end thereof, and slid along therein until it lies to the farther side of grooves 26 formed in the side walls of said socket, after which keeper 25 is inserted into the grooves 26. Keeper 25 is in the form of a flat wedge-shaped key. Block 22 is formed with an external spiral groove 22′ which increases in depth in an upward direction and at its upper end portion curves inwardly abruptly to enable the cable being more firmly held, see Figs. 4 and 5. In this groove, the free end portion of cable 21 is arranged, as shown in Fig. 1 and suitable means, as an eccentric gripping member 27, is pivotally supported in the upper end portion thereof to clamp the cable. Block 22 is secured by a bolt 28 on a support 29 provided on one end of member 2, and to prevent rotation thereof on said support, I form the upper end of the support angular in cross section and arrange the same in a seat provided in the underface of the said block, as clearly shown in Fig. 5. Engaging member 24 is provided with an eye 24′ with which another length of cable can be readily coupled, should it be found desirable to increase the length of cable 21, in which event the added length or section of cable must also be provided with an engaging member for reception in socket 23 of drum 6, as will readily be understood.

Reference numeral 30 indicates a suitable member with which a cable can be engaged to anchor the machine.

After a stump has been extracted, sweep 11 is swung in a backward direction until disengaged from lips 13, then elevated and engaged with catch 19, as previously described, after which the drum 6 can be released from pawl 9 and rotated to again "run out" the cable without having such movement imparted to said sweep.

Various changes can be made in the minor details of construction without departing from the spirit of my invention, as defined in my annexed claims.

Having thus fully described my invention, what I claim as new and desire to secure by Letters Patent of the United States of America, is:

1. A stump pulling machine comprising a base, a vertically disposed shaft on said base formed with a longitudinal channel, a drum journaled on said shaft, a rod extending through the channel of said shaft and being provided with a shoulder bearing on the upper end thereof, a stem fixed to said rod and extending upwardly from said drum, a sweep removably supported on said drum and slidably connected with said stem, and means on said stem for holding said sweep elevated from said drum, whereby said drum can be rotated independently of said sweep.

2. A stump pulling machine comprising a base, a vertically disposed shaft thereon, a drum journaled thereon, a guide means extending above said drum and being secured to said base, a sweep removably connected with said drum and being slidably supported on said guide means, and a catch pivoted on the upper end portion of said guide means for holding said sweep in an elevated position, said catch being curved and provided on its free end portion with a barb.

3. A stump pulling machine comprising a base, a hollow shaft thereon, a drum journaled on said shaft and formed in its upper end with a seat, a sweep removably arranged on the upper end portion of said drum, vertically arranged guide means for said sweep, a catch on the upper end portion of said guide means arranged to engage and hold said sweep elevated from said drum, a member secured to said guide means and extending downwardly through said shaft, said member and said base being formed with registering apertures, and a wedge shaped key engaged in said registering apertures, said member being provided at its upper portion with an outwardly extending shoulder seated in the seat of said drum.

4. A stump pulling machine comprising a base, a drum rotatably mounted thereon and provided with ratchet teeth, a pawl on said base arranged to engage the teeth of said drum, said drum being formed in one of its flanges with a tapered socket, a tapered engaging member arranged in said socket of the drum, and a cable secured to said engaging member.

5. A stump pulling machine comprising a base, a drum rotatably mounted thereon and provided with ratchet teeth, a pawl on said base arranged to engage the teeth of said drum, said drum being formed in one of its flanges with a tapered socket extending inwardly from its edge, a cable, an engaging member secured to said cable and engaged in the socket of said drum, and means for preventing said engaging member sliding outwardly from said socket of the drum.

6. A stump pulling machine comprising a base, a drum rotatably mounted thereon and provided with ratchet teeth, a pawl on said base arranged to engage the teeth of said drum, said drum being formed in one of its flanges with a socket extending inwardly from its edge, the side walls of said socket being formed with grooves, a cable, an engaging member secured to said cable and engaged in the socket of said drum, and a keeper for preventing displacement of said engaging member removably engaged in the grooves of said socket.

7. In a machine for pulling stumps, in combination with the base, the drum, and the cable having one of its ends made fast to said drum, a means for securing the other end of said cable to said base comprising a body formed with a spiral groove for reception of said cable, and means for preventing slipping of the cable in said groove.

8. In a machine for pulling stumps, in combination with the base, the drum and the cable having one of its ends made fast to said drum, a means for securing the other end of said cable to said base comprising a body formed with a groove extending in a spiral path and gradually increasing in depth.

9. In a machine for pulling stumps, in combination with the base, the drum, and the cable having one of its ends made fast to said drum, a means for securing the other end of said cable to said base comprising a body formed with a spiral groove for reception of the cable, and an eccentric for clamping said cable in said groove.

10. A cable holding means comprising a body formed with an external spiral groove, and means pivotally supported on said body for preventing slipping of the cable in said groove thereof.

11. A cable holding means comprising a body formed with an external spirally extending groove which gradually increases in depth from one end portion to the other, and a clamping means on said body for preventing slipping of the cable in the groove thereof.

12. A cable holding means comprising a body formed with an external spirally extending groove which increases in depth in an upward direction, the upper end portion of said groove curving abruptly in an inward direction, and a clamping means in the upper end portion of said groove.

13. In combination with a support having its upper portion formed angular in cross section, a body formed with a seat for reception of the upper portion of said support, said body being formed with a cable receiving groove, means for securing said body to said support, and means for engagement with the cable for preventing the same slipping in the groove of said body.

Signed at Victoria, B. C., Canada, this 10 day of December, 1908.

JOSEPH DUCREST.

Witnesses:
J. P. MANN,
ALICE M. HICKEY.